(12) United States Patent
Attard et al.

(10) Patent No.: US 7,267,040 B2
(45) Date of Patent: Sep. 11, 2007

(54) BOOSTER WITH REDUCED DEAD TRAVEL AND A BRAKING SYSTEM COMPRISING SUCH A BOOSTER

(75) Inventors: Jean-Marc Attard, Villers sous St Leu (FR); Chris Anderson, Paris (FR); Raynald Sprocq, Vaires sur Marne (FR)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 10/557,668

(22) PCT Filed: Jun. 22, 2004

(86) PCT No.: PCT/FR2004/001553

§ 371 (c)(1),
(2), (4) Date: Nov. 22, 2005

(87) PCT Pub. No.: WO2005/000655

PCT Pub. Date: Jan. 6, 2005

(65) Prior Publication Data

US 2007/0056438 A1    Mar. 15, 2007

(30) Foreign Application Priority Data

Jun. 23, 2003  (FR) .................................. 03 07572

(51) Int. Cl.
*F15B 9/10* (2006.01)

(52) U.S. Cl. .................. 91/376 R; 60/554; 60/582

(58) Field of Classification Search ............... 91/369.2, 91/376 R; 60/554, 582
See application file for complete search history.

(56) References Cited

U.S. PATENT DOCUMENTS

| 3,973,593 | A | | 8/1976 | Muller |
| 5,167,180 | A | | 12/1992 | Verbo et al. |
| 5,479,844 | A | * | 1/1996 | Heibel et al. ............ 303/114.3 |
| 5,579,675 | A | | 12/1996 | Gautier |
| 6,334,383 | B1 | * | 1/2002 | Tsubouchi et al. ............ 91/367 |
| 6,408,738 | B1 | * | 6/2002 | Harth et al. ............... 91/369.2 |
| 6,467,390 | B1 | | 10/2002 | Harth et al. |
| 6,755,116 | B1 | | 6/2004 | Tsubouchi et al. |

* cited by examiner

*Primary Examiner*—Igor Kershteyn
(74) *Attorney, Agent, or Firm*—Leo H. McCormick, Jr.; Sarah Taylor

(57) ABSTRACT

A pneumatic brake booster with short actuating travel, comprising a skirt and a pneumatic piston that are rigidly connected and slideably mounted in a sealed casing to delimit a low-pressure chamber and a variable-pressure chamber and a three-way valve arrangement that is controlled by a control rod connected at a first end to a brake pedal. The three-way valve arrangement having first and second valve seats and a valve that is applied to at least one of the first and second valve seats by a valve spring. The second valve seat being borne by a first longitudinal end of a plunger distributor while the first valve seat is borne by a first longitudinal end of a bushing slideably mounted in a sealed manner in the pneumatic piston over a defined first travel and beyond the defined travel the bushing is secured axially to the pneumatic piston.

26 Claims, 14 Drawing Sheets

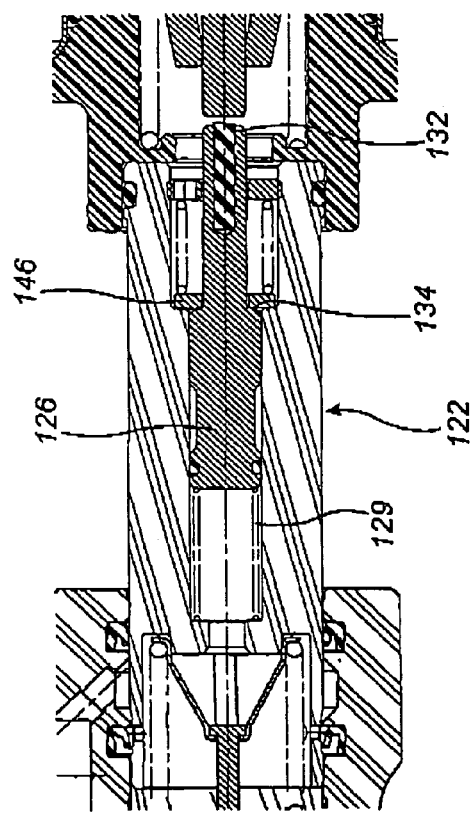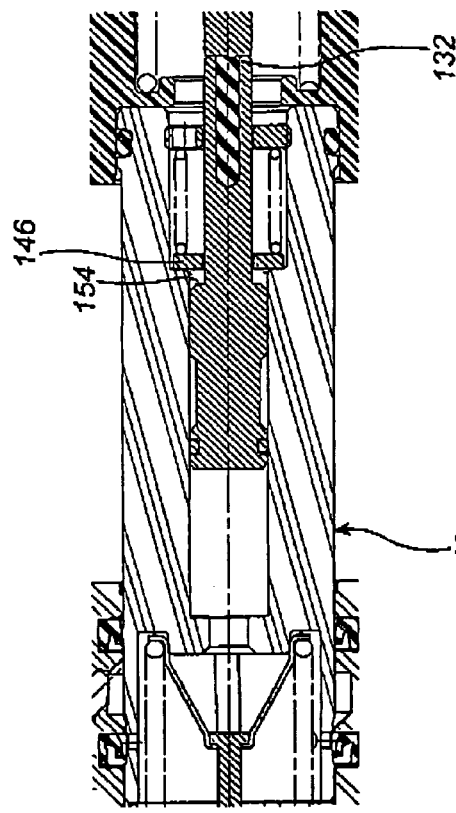
Fig. 14b
Fig. 14a

BOOSTER WITH REDUCED DEAD TRAVEL AND A BRAKING SYSTEM COMPRISING SUCH A BOOSTER

The present invention relates primarily to a rapid-actuation pneumatic brake booster and to a braking system comprising such a booster.

BACKGROUND OF THE INVENTION

A rapid-actuation braking device, also referred to as a reduced dead travel braking device, is known from the prior art and comprises a master cylinder actuated by a control rod actuated by a driver, the action of the driver being amplified by a pneumatic booster by means of which it is possible to reduce the pedal travel necessary to obtain a braking action.

The booster of known type, described for example in document FR 2 696 143, comprises a casing in which a skirt dividing the inner space of the casing into a low-pressure chamber and a variable-pressure chamber is slideably mounted in a sealed manner.

The skirt comprises a central passage in which is mounted a pneumatic piston provided with a three-way valve arrangement controlled by the control rod, placing the low-pressure chamber and the working chamber at rest in communication, and isolating the low-pressure chamber from the working chamber and placing the working chamber in communication with a high-pressure fluid source.

The skirt is mounted so that it can move axially with respect to the pneumatic piston over a defined travel at the start of braking. Consequently, when the driver presses on the brake pedal, the working chamber is isolated from the low-pressure chamber and fills with high-pressure pneumatic fluid. Owing to the pressure differential between the low-pressure chamber and the working chamber, the skirt moves into the low-pressure chamber without taking along the pneumatic piston over the defined travel. Consequently, the driver does not have to depress the pedal further to keep the working chamber supplied with high-pressure pneumatic fluid. The movement of the skirt is transmitted to a primary piston of a master cylinder, causing the valves of the master cylinder to close and the pressure at the brakes to rise.

Beyond the defined travel, the skirt bears on a radially external part of the pneumatic piston, their movements then being connected. From this moment, the driver must depress the control rod further to obtain an increase in the braking intensity. Following the selection of the dead travel, the driver will not be able to tell from the brake pedal the travel required to close the valves of the master cylinder, this travel, also referred to as dead travel, not producing any rise in pressure in the brakes, or the driver will directly feel a strong deceleration, giving the sensation of applied braking.

This device, referred to as a concealed dead travel device since it conceals the dead travels from the driver, is entirely satisfactory but continues to form the subject of research to simplify it in order to reduce its complexity, make it easier to assemble and also reduce its cost price. The device is thus structurally extremely complex since it requires contorting the pneumatic piston and a multi-pass stamping operation has to be carried out.

SUMMARY OF THE INVENTION

It is consequently an object of the present invention to provide a braking device with short actuating travel which is structurally simple and can be easily adapted to the known device.

It is another object of the present invention to provide a braking device with short actuating travel which is simple to assemble and has a moderate cost price.

The objects stated above are achieved by a pneumatic brake booster comprising an assembly made up of a skirt and a pneumatic piston which are rigidly connected to one another, and a three-way valve arrangement comprising a first valve seat and a second valve seat, the first seat not being secured to the pneumatic piston over a first defined axial travel and a second valve seat borne by a plunger distributor. Beyond said defined travel, the first valve seat becomes secured to the pneumatic piston.

In other words, during a first braking phase, the axial movement of the first valve seat is independent of the axial movement of the pneumatic piston.

The subject of the present invention is primarily a pneumatic brake booster comprising a casing of longitudinal axis formed by first and second shells connected by their radially external ends, in which casing an assembly made up of a skirt and a pneumatic piston of longitudinal axis is slideably mounted in a sealed manner, said assembly dividing the inner space of the casing into a low-pressure chamber and into a variable-pressure chamber, a return spring which returns the skirt/pneumatic piston assembly into the rest position being mounted in the low-pressure chamber between the first shell and a face of the pneumatic piston, a three-way valve arrangement actuated by a control rod being mounted in a longitudinal passage bored in the pneumatic piston, said control rod being connected by a first longitudinal end to a brake pedal and a second end of said control rod being received in a reception cavity made in a first longitudinal end of a plunger distributor, said control rod being returned into a rest position by a return spring, said plunger distributor comprising, at a second longitudinal end, a feeler which applies the force of the control rod to a hydraulic piston of a master cylinder by way of a reaction device, said skirt/piston assembly transmitting a pneumatic boost force to the hydraulic piston of the master cylinder via a central face of the pneumatic piston, said three-way valve arrangement comprising first and second valve seats and a valve applied to at least one of the first and second valve seats by a valve spring, said second valve seat being borne by a first longitudinal end of the plunger distributor, characterized in that the first valve seat is borne by a first longitudinal end of a bushing slideably mounted in a sealed manner in the pneumatic piston over a first defined travel, and in that it comprises a securing means able to connect said bushing axially to the pneumatic piston when said pneumatic piston has completed the defined travel.

Another subject of the present invention is a booster, characterized in that it comprises an elastic means maintaining the bushing immobile with respect to the casing of the booster until such time as said defined travel has been achieved, said elastic means being mounted in compression axially between an annular bearing surface made in a wall of an axial passage of the pneumatic piston and a shoulder of the bushing.

Another subject of the present invention is a booster, characterized in that it comprises a second key, perpendicular to the axis, mounted fixedly in two third diametrically opposed apertures in the pneumatic piston and arranged axially between the first apertures and the brake pedal and passing through two fourth diametrically opposed apertures made in the bushing so as to form an axial stop in the direction of the brake pedal for the plunger distributor by cooperation between an annular collar secured to the plunger distributor and first and second branches of the second key and so as to define the rest position of the pneumatic piston by cooperation of the transverse ends of said second key with the booster casing.

Another subject of the present invention is a booster, characterized in that the annular bearing surface of the pneumatic piston is formed by an axial narrowing borne by a face of the pneumatic piston transmitting the boost force to the hydraulic piston of the master cylinder, and in that the shoulder of the bushing is situated axially between the first key and the feeler of the plunger distributor.

Another subject of the present invention is a booster, characterized in that said securing means is a first key which is secured in terms of movement to said bushing and passes, perpendicularly to the axis, through two first diametrically opposed apertures made in the tail of said pneumatic piston and through two second diametrically opposed apertures made in the bushing, and in that said defined travel is equal to the distance separating a rear end of the first apertures from a first rear face of the first key, and in that said first key is in the shape of a fork having two branches.

Another subject of the present invention is a booster, characterized in that the return spring for the control rod is mounted so that it bears between a bottom end of an axial groove in the pneumatic piston and a first face of a frustoconical widening of the plunger distributor, said widening bearing on a second face opposed to the first face bearing the second valve seat.

Another subject of the present invention is a booster, characterized in that it comprises an emergency brake-boosting device formed by means which are able to move the first valve seat axially in the brake direction when the plunger distributor is moved at a speed above a defined speed.

Another subject of the present invention is a booster, characterized in that the first and second arms of the first key are radially elastic, able to be parted radially from one another and cooperate with an axial step borne by the two second apertures, said step defining a first axial position and a second axial position for the bushing, and in that the plunger distributor comprises a means for moving the arms of the first key away radially.

Another subject of the present invention is a booster, characterized in that the means for moving the arms away from one another is a substantially frustoconical surface widening in the direction of the brake pedal, connected rigidly to the plunger distributor and arranged axially between the first key and the second key.

Another subject of the present invention is a booster, characterized in that said pneumatic piston comprises an annular axial groove receiving said bushing and defining a central tubular section receiving the plunger distributor, and in that the annular bearing surface is made in a wall of the axial groove.

Another subject of the present invention is a booster, characterized in that the central tubular section comprises two fifth diametrically opposed apertures for the passage of the second key.

Another subject of the present invention is a booster, characterized in that said securing means is a first key secured in terms of movement to said pneumatic piston and passing, perpendicularly to the axis, through two first diametrically opposed apertures made in the tail of said pneumatic piston and through two second diametrically opposed apertures made in the bushing, in that a distance equal to the defined travel separates a second longitudinal end of the bushing and a first face of said first key, and in that said key is in the shape of a fork having two branches straddling the central tubular section of the pneumatic piston.

Another subject of the present invention is a booster, characterized in that the elastic means is a cylindrical spring.

Another subject of the present invention is a booster, characterized in that the sliding movement between the bushing and the pneumatic piston is sealed by an O-ring seal mounted in a groove made in the outer wall of the bushing.

Another subject of the present invention is a booster, characterized in that it comprises means for reducing the initial speed of movement of the pneumatic piston relative to the booster casing.

Another subject of the present invention is a booster, characterized in that said means for reducing the initial speed of the piston comprise a passage for communication between the low-pressure chamber and the high-pressure chamber when the valve is moved apart from the second valve seat until such time as the pneumatic piston has completed a second defined travel.

Another subject of the present invention is a booster, characterized in that said passage is formed by a duct formed between an outer wall of a sleeve bearing at an axial end the valve and the passage of the piston, at least one radial bore made in a first axial cylindrical extension of a cage surrounding the control rod and at least one axial bore in the sleeve placing the variable-pressure chamber in communication with an annular chamber delimited by the sleeve, the first cylindrical extension and a second inner cylindrical extension, which is concentric to the first extension and connected in a sealed manner to the first extension by an axial end oriented toward the brake pedal, and in that the sleeve comprises at an opposite end to the valve a lip which is able to come into a blocking position over the radial bore when the piston has moved by the defined travel.

Another subject of the present invention is a booster, characterized in that the second defined travel is at most equal to the first defined travel.

Another subject of the present invention is a booster, characterized in that the reaction device comprises an auxiliary piston which is slideably mounted in a sealed manner in an axial through bore of the hydraulic piston of the master cylinder and is subjected via a first end to the hydraulic pressure prevailing in the master cylinder and is thereby capable of coming into contact with the feeler of the plunger distributor via a second opposed longitudinal end, and in that it also comprises a jump spring supported fixedly via a first longitudinal end on the hydraulic piston and via a second end supported in a floating manner with respect to the hydraulic piston.

Another subject of the present invention is a booster, characterized in that the fixed support is a ring force-fitted into the axial bore of the hydraulic piston, and in that the floating support is a ring mounted slideably in the axial bore and supported, when the pressure in the master cylinder is below the defined pressure, against an annular bearing surface of the bore connecting first and second portions.

Another subject of the present invention is a booster, characterized in that the auxiliary piston is supported via the second longitudinal end against the feeler, and in that a clearance is provided between the floating support and a shoulder of the auxiliary piston.

Another subject of the present invention is a booster, characterized in that the auxiliary piston is supported against the floating support by a shoulder, and in that a clearance is provided between the second longitudinal end and the feeler.

Another subject of the present invention is a booster, characterized in that the reaction device comprises a return spring mounted so that it bears between the first end of the auxiliary piston and an end of the axial bore, keeping the auxiliary piston in contact with the floating support, and in that a clearance is provided between the second longitudinal end of the auxiliary piston and the feeler.

Another subject of the present invention is a booster, characterized in that the reaction device comprises a return spring mounted so that it bears between the first end of the auxiliary piston and an end of the axial bore, said spring keeping the auxiliary piston bearing against the feeler via the second longitudinal end, and in that a clearance is provided between the floating support and a shoulder of the auxiliary piston.

Another subject of the present invention is a booster, characterized in that the sliding movement between the auxiliary piston and the axial bore of the hydraulic piston is sealed by means of an O-ring seal mounted in a groove made in the periphery of the auxiliary piston.

Another subject of the present invention is a booster, characterized in that the auxiliary piston comprises at its second end a shock-absorbing element, advantageously made of elastomer, intended to reduce the contact noise between the feeler and the auxiliary piston.

Another subject of the present invention is a braking device comprising a master cylinder connected hydraulically to brakes arranged at the wheels of a motor vehicle and a booster interposed between the master cylinder and a control rod moved by means of a brake pedal, said booster transmitting a force applied to the pedal and applying a pneumatic boost force to a hydraulic piston of the master cylinder, characterized in that said booster is a booster according to the present invention, and in that said hydraulic piston bears via a first longitudinal end against an end of the pneumatic piston emerging into the low-pressure chamber of the booster.

The present invention will be better understood with the aid of the description below and of the appended figures in which the front and rear respectively correspond to the left and right of the drawings.

BRIEF DESCRIPTION OF THE DRAWINGS

FIG. 7a is a detail view of FIG. 7;

FIG. 9a is a detail view of FIG. 9;

FIGS. 14a and 14b are part views in longitudinal section of variant embodiments of the present invention.

DETAILED DESCRIPTION OF THE INVENTION

The same references will be used to describe those elements having the same functions.

Figure 1:
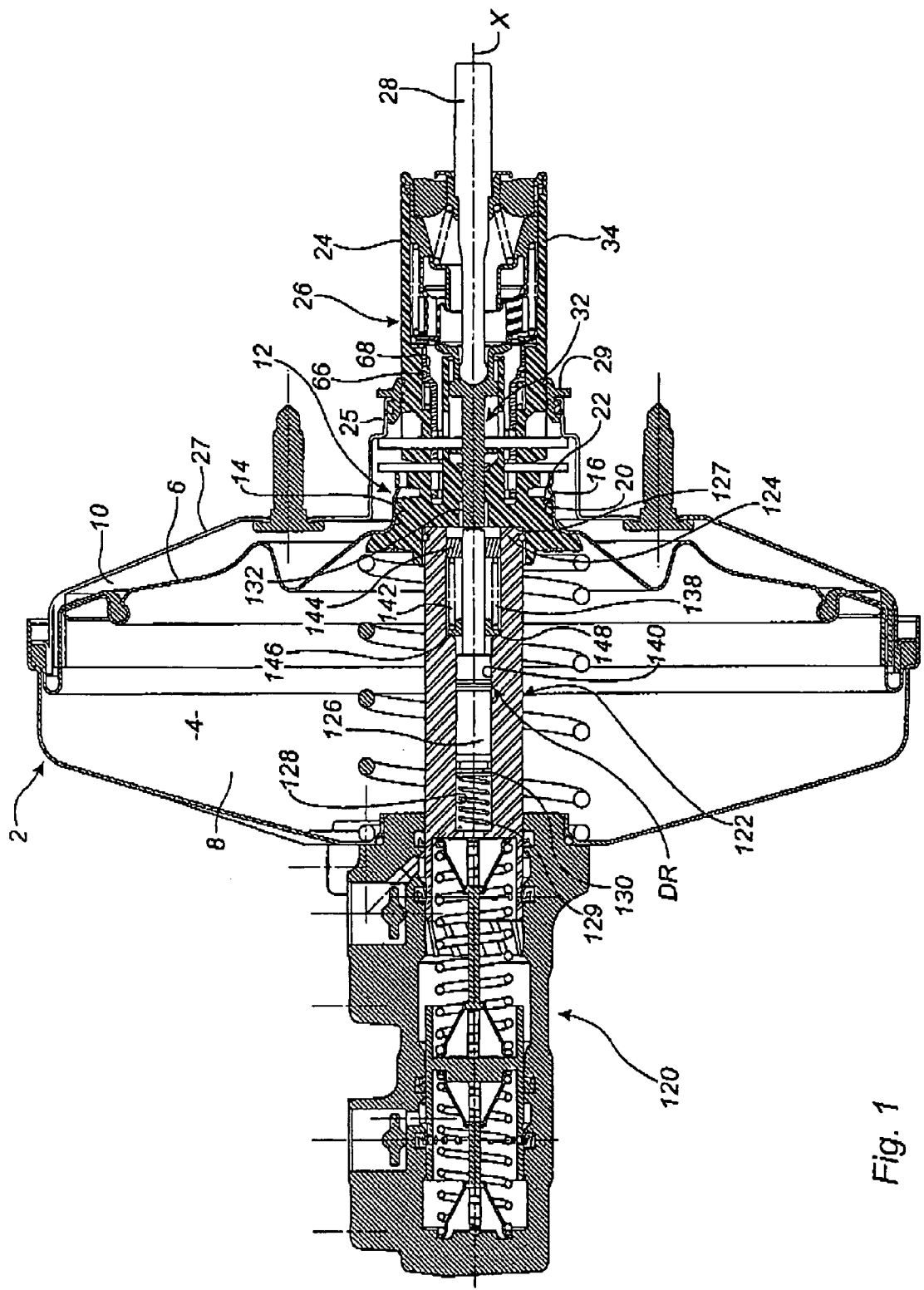
FIG. 1 is a view in longitudinal section of a first embodiment of a booster according to the present invention at rest.
Figure 2:
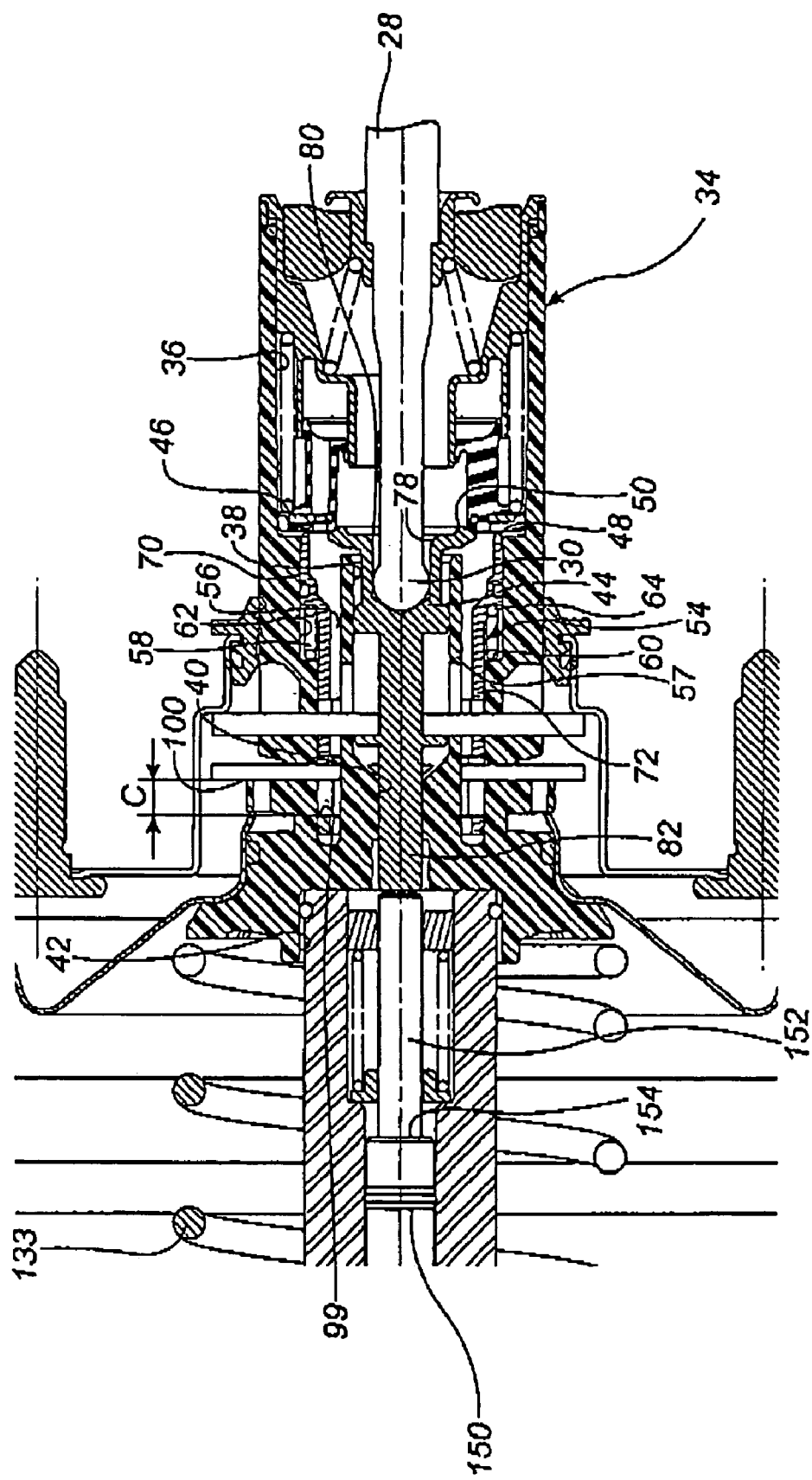
FIG. 2 is an enlarged detail view of FIG. 1.

FIGS. 1 and 2 show a booster according to the present invention in the rest position, the booster comprising a casing 2 of longitudinal axis X delimiting an inner space 4, a skirt 6 mounted so that it can slide axially in a sealed manner in the space 4 and dividing the space 4 into a first low-pressure chamber 8 or front chamber and a second variable-pressure chamber 10 or rear chamber, a piston 12 being securely mounted in a sealed manner in the skirt 6 in a central orifice 14 of the skirt 6. However, it goes without saying that a skirt/pneumatic piston assembly produced as a single piece could be provided.

The front chamber is supplied with low-pressure pneumatic fluid. The rear chamber is able to be placed in communication with the low-pressure chamber or with a high-pressure pneumatic fluid source, for example air at atmospheric pressure, by means of a three-way valve arrangement 26.

The central orifice 14 in the skirt 6 is bordered by a rearwardly oriented, substantially frustoconical collar 16 in which a correspondingly shaped first front end 18 of the pneumatic piston 12 is received. A sealing means 20 is arranged between an inner surface of the frustoconical collar and an outer surface of the first front end 18 of the piston 12; it is, for example, an O-ring seal mounted in a groove 22 made in the outer surface of the piston 12.

The pneumatic piston extends rearward by way of a substantially cylindrical piston tail 24 slideably mounted in a sealed manner, by means of a scraping seal 29, in a hollow shaft 25 formed integrally with a rear shell 27 of the casing. The pneumatic piston 12 is passed right through axially by a passage 34 in which, in a first rear part, the three-way valve arrangement 26 actuated by a control rod 28 is mounted.

The control rod is connected via a first end to a brake pedal (not shown) and via a second end 30 to a plunger distributor 32.

The passage 34 advantageously comprises, oriented from the rear toward the front, a first rear part 36 of larger diameter, a second part 38 whose diameter is smaller than the diameter of the first part 36, a third part 40 whose diameter is smaller than the diameter of the second part 38, and a fourth part 42 whose diameter is greater than the diameter of the third part 40.

The second end 30 of the control rod 28 is swivel-mounted in a first rear end 44 of the plunger distributor.

The three-way valve arrangement 26 comprises a valve 46 which can cooperate with a first equalizing valve seat 48 and a second intake valve seat 50. The first valve seat 48 is borne by a rear longitudinal end of a bushing 54 slideably mounted in a sealed manner in an axial annular groove 56 made in the pneumatic piston 12 and surrounding the second part 38 of the passage 34. The axial groove 56 delimits a central tubular section 57 in the piston.

An elastic means 58, for example a cylindrical spring, is mounted in reaction between an annular bearing surface 60 made in a wall 62 of the axial groove 56 and a shoulder 64 on the outer wall of the bushing 54, the shoulder 64 connecting a first larger-diameter rear part 70 of the bushing to a second smaller-diameter part 72 of the bushing. The elastic means 58 allows the bushing 54, to be kept immobile with respect to the booster casing until such time as the pneumatic piston has completed a defined travel C.

In the example represented, the sliding movement between the bushing 54 and the outer wall 62 of the groove 56 is sealed by an O-ring seal 66 mounted in a groove 68 made in the outer wall of the bushing 54. Of course, a groove could be provided for example in the outer wall 62 of the axial groove 56 to receive the sealing means.

The second valve seat 50 is borne by a frustoconical widening 78 of the first rear end 44 of the plunger distributor surrounding the second front end of the control rod 28.

The plunger distributor advantageously comprises a first larger-diameter cylindrical section 80, which is substantially equal to the inside diameter of the second part 38 of the passage 34, and a second smaller-diameter cylindrical section 82 which is substantially equal to the diameter of the third part 40 of the passage 34. Thus, the plunger distributor is axially guided by the second 38 and third 40 part of the passage 34.

The booster according to the present invention also comprises a first element 84 which is able to connect the piston and the bushing 54 axially beyond the defined travel C. Said element 84 is formed by a first key which passes, perpendicularly to the axis X, through two first diametrically opposed apertures 86 in the piston and through two second diametrically opposed apertures 88 made in the smaller-diameter part 72 of the bushing 54.

The key 84 is mounted fixedly in the pneumatic piston 12.

The key 84 has the approximate shape of a fork having two parallel branches straddling the tubular central section 57.

The travel C is defined by the distance separating a first front face 100 of the key and the first longitudinal front ends 99 of the second apertures 88.

The booster also comprises a second key 90 forming an axial return stop for the distributor and mounted parallel to the first key 84 axially to the rear of the latter. The second key 90 passes through two diametrically opposed third apertures 92 made in the piston axially to the rear of the first apertures 86, through two fourth diametrically opposed apertures 94 made in the bushing axially to the rear of the second apertures 88, and through fifth diametrically opposed apertures 96 made in the central tubular section 57. The key 90 has the approximate shape of a fork comprising two parallel arms straddling the second smaller-diameter cylindrical section 82. The arms of the second key 90 are able to cooperate with an annular collar 98 protruding radially from the second smaller-diameter cylindrical section 82, axially retaining the plunger distributor in the direction of the brake pedal.

Furthermore, the key 90 comprises, along an axis perpendicular to the axis X, ends 117 protruding radially from the piston tail and able to bear against an annular bearing surface 119 of the hollow shaft 25 of the booster casing 2, thereby defining the rest position for the pneumatic piston 12.

The collar 98 has an outside diameter substantially equal to the inside diameter of the second part 38 of the passage 34, improving axial guiding of the plunger distributor in the passage 34.

The valve 46 of the three-way valve arrangement is formed by an annular surface contained in a plane orthogonal to the axis X borne by a front longitudinal end of a sleeve 102 made of flexible material and mounted immovably in the piston tail by way of a cage 104 fitted, for example force-fitted, in the piston tail. The cage and the sleeve surround the control rod. A valve spring 106 is mounted in reaction between an outer shoulder 108 of the cage 104 and a rear face 110 of the valve, confirming application of the valve on one or other or both valve seats.

A return spring 112 for the control rod is mounted in compression between an annular bearing surface 114 of the cage 104 and a projecting surface (not shown) of the control rod.

The plunger distributor comprises at a second front longitudinal end a feeler 116 which is able to come into contact with a reaction device DR mounted in a tail of a piston 118 of a master cylinder 120.

The master cylinder 120 bears via a longitudinal rear end against a front shell of the casing and comprises at least one hydraulic piston 122 bearing via a longitudinal rear end 124 against a front face of the pneumatic piston; in the example represented, the end 124 of the hydraulic piston 122 bears flat against an annular bearing surface 127 connecting the third part 38 and the fourth part 40 of the passage 34 of the pneumatic piston 12.

The rear end 124 of the hydraulic piston is mounted in a sealed manner in the fourth part by means of a sealing means mounted in a groove in the hydraulic piston. Of course, a groove could be provided in the pneumatic piston.

FIG. 1 shows a first variant embodiment of the reaction device DR, comprising an auxiliary piston 126 slideably mounted in a sealed manner in an axial through bore 128 in the hydraulic piston 122 and in communication with the primary chamber of the master cylinder. The auxiliary piston 126 is provided at a first longitudinal front end with a first surface 130 subjected to the hydraulic pressure prevailing in the master cylinder and at a second longitudinal rear end with a second surface 132 opposite the feeler.

A return spring 129 for the auxiliary piston 126 is mounted in the bore 128 between the first surface 130 and a front end of the bore 128.

The reaction device DR also comprises a jump spring 138, which is familiar to those skilled in the art, mounted in a first larger-diameter rear portion 140 relative to a second smaller-diameter front portion 142, the spring being mounted between a first radial support 144 mounted fixedly in the first portion 140, formed for example by a force-fitted ring, and a second support 146 mounted in a floating manner in the first portion 140 and, at rest, bearing against an annular bearing surface 148 connecting the first and the second portions 140, 142. In the example represented, the support 146 is formed by a ring whose cross section is advantageously in the shape of a hat so as to form an axial guide for a front end of the spring.

The auxiliary piston 126 has a stepped shape and comprises a first larger-diameter portion 150 slideably mounted in the second smaller-diameter portion 142 of the bore 128 and a second smaller-diameter portion 152 slideably mounted in the first larger-diameter portion 140 and, in particular, in the rings 144, 146. The first portion 150 and the second portion 152 of the auxiliary piston 126 are connected by a shoulder 154. The auxiliary piston bears via the second surface 132 against the feeler.

The sliding movement is sealed in the example represented by an O-ring seal borne by the auxiliary piston on the first larger-diameter portion.

A return spring 133 returning the pneumatic piston 12 into the rest position is mounted in compression between a front face of the pneumatic piston and the front shell.

We will now explain the operation of the booster according to the present invention.

In the rest position (FIGS. 1 and 2), the valve 46 is lifted off the first equalizing valve seat 48, placing the front chamber 8 and the rear chamber 10 in communication, and bears on the second intake valve seat 50.

Figure 3:
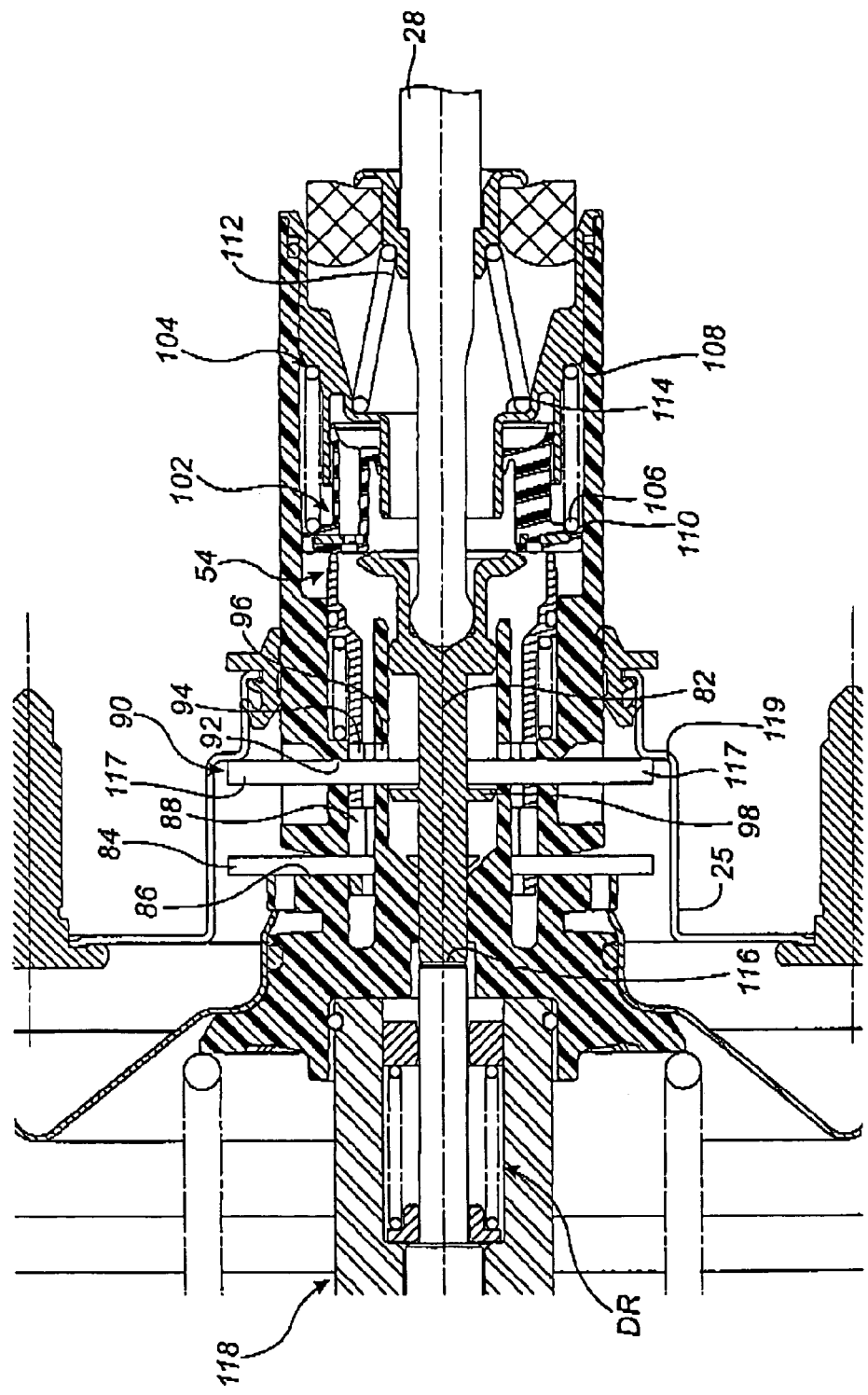
FIG. 3 is a part view of the booster of FIG. 1 in longitudinal section, in a first actuating phase.

At the start of a braking phase (FIGS. 3 and 4), when the driver is pressing on the brake pedal, the actuating rod 28 is moved axially forward, the valve 46 is then applied to the first valve seat 48, isolating the rear chamber from the front chamber, and lifts off the second seat 50, allowing air at atmospheric pressure to be supplied into the rear chamber. Owing to the pressure difference between the front chamber and the rear chamber, the skirt 6 and the piston 12 are taken along toward the front. The first valve seat 48 borne by the bushing 54 is immobile until such time as the clearance C between the key 84 and the front end of the second apertures 88 has been traversed. The spring 58 keeps the bushing in a defined axial position. The hydraulic piston of the master cylinder is taken along by the pneumatic piston, which for its part takes along the auxiliary piston 126, which moves away from the feeler.

Beyond a defined pressure in the master cylinder sufficient to enable the auxiliary piston 126 to overcome the jump spring, the auxiliary piston is pushed back in the direction of the feeler until coming into contact with it and then retransmits the reaction of the hydraulic circuit to the brake pedal.

When the pneumatic piston 12 has completed the travel C, the front face of the key 84, which is fixed with respect to the pneumatic piston, bears against the front end of the second apertures 88 in the bushing, the bushing then being connected axially to the movement of the piston. The valve 46 comes into contact with the intake valve seat 50 and interrupts the supply of air at atmospheric pressure to the rear chamber. The driver must then depress the brake pedal further to increase the braking level.

The free travel C is advantageously chosen so that it corresponds to the dead travel of the master cylinder, that is to say to the required travel of the hydraulic piston in the master cylinder to obtain the start of the rise in pressure of the brake fluid in the brakes. However, it would of course not constitute a departure from the scope of the present invention to select a travel C which, depending on the brake feel that is sought, is greater or smaller than the dead travel of the master cylinder.

Consequently, the driver feels from the pedal only the travel necessary to close the equalizing valve and to open the intake valve and does not feel the deal travel of the master cylinder. Driver comfort is then increased since the driver has the sensation of immediate braking.

Figure 4:
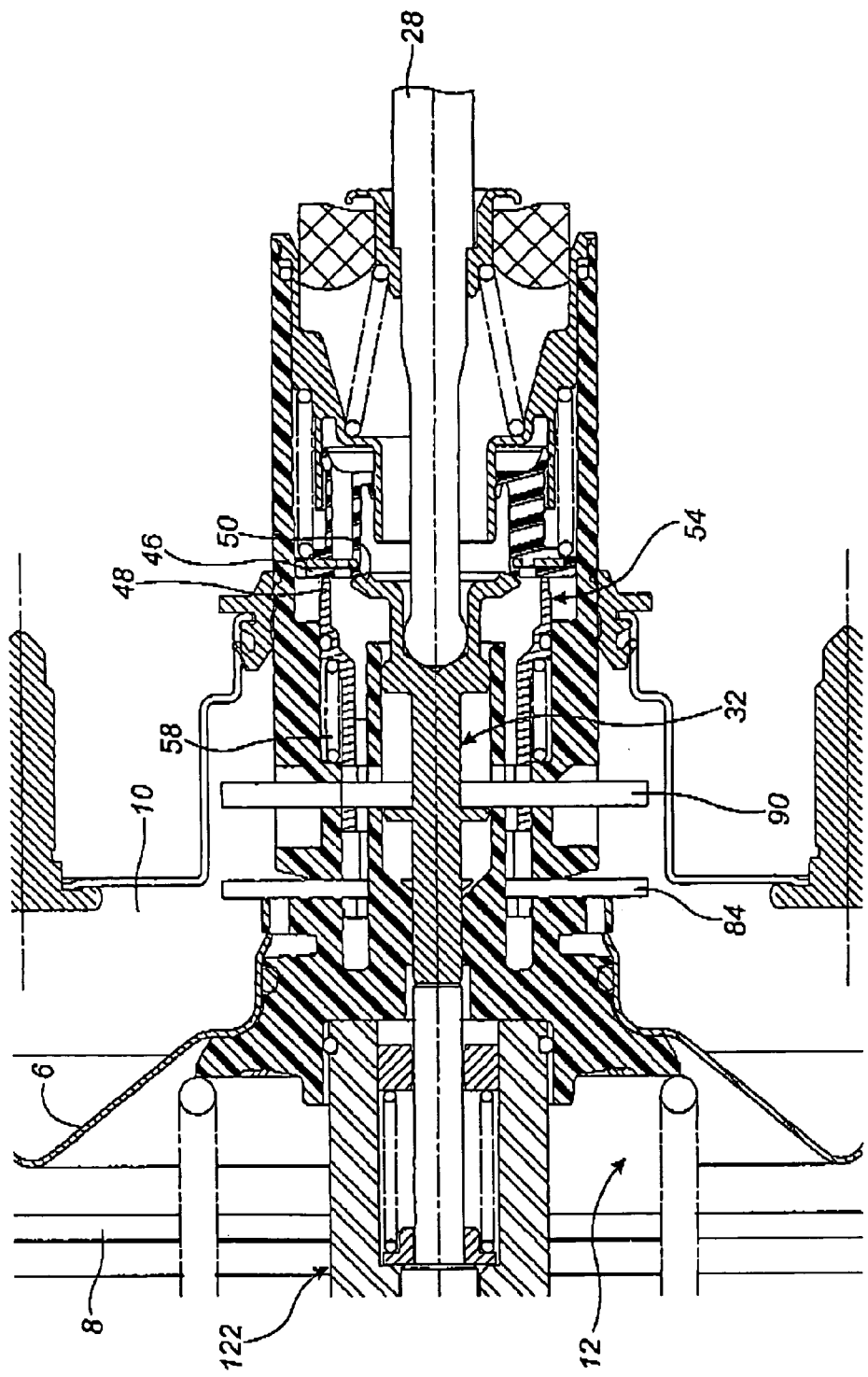
FIG. 4 is a part view of the booster of FIG. 1 in longitudinal section, in a second actuating phase.

Next, the braking phase represented in FIG. 4 corresponds to the state of equilibrium reached when the driver maintains the braking at a defined level. The valve 46 is then in contact with the equalizing seat 48 and the intake seat 50, interrupting the supply of air at atmospheric pressure to the rear chamber.

In the example represented, at rest the valve 46 is in contact with the intake seat 50 and is at a distance from the equalizing seat 48. Thus at the start of a braking action, the valve 46 comes into contact with the equalizing seat 48 to interrupt communication between the front chamber and the rear chamber and moves away from the intake seat 50, allowing high-pressure air to enter the rear chamber. However, the present invention also applies to a brake booster comprising what is known as an ZLT (zero lost travel) three-way valve arrangement in which the valve is both in contact with the equalizing seat and with the intake seat. The equalizing seat is then, at rest, formed by a projection of the pneumatic piston and, during a braking action, by the bushing 54.

Figure 5:
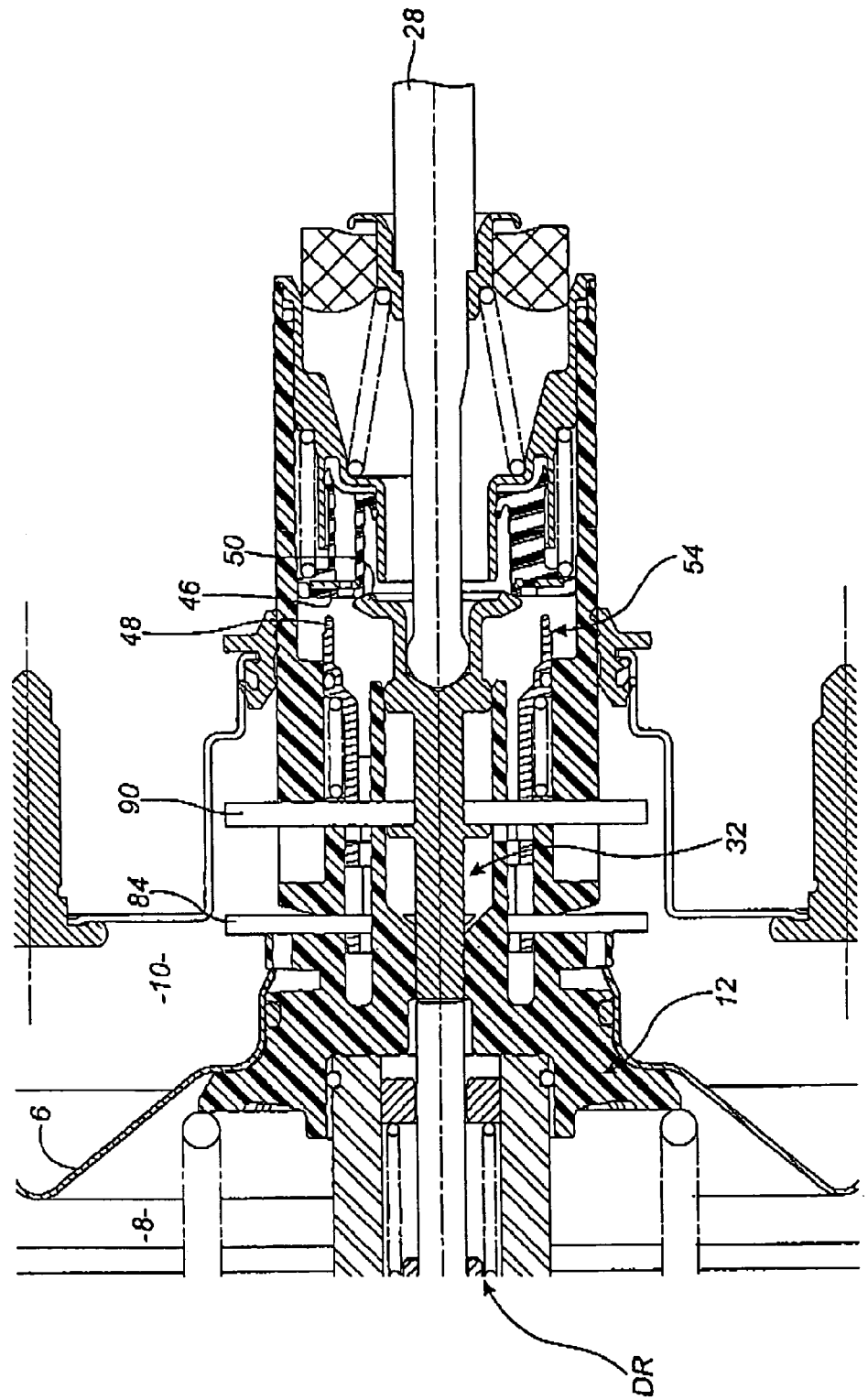
FIG. 5 is a part view of the booster of FIG. 1 in longitudinal section, in a third actuating phase.

FIG. 5 represents the booster in the saturation phase, which corresponds to the moment when the booster no longer provides additional assist, the pressure prevailing in the rear chamber being atmospheric pressure. The pneumatic piston is no longer able to advance axially, with the consequence that the bushing 54 and the equalizing valve seat 48 are immobile. Any additional braking force provided by the driver moves the control rod 28 and the intake seat away from the valve 46; however, this additional force is no longer amplified. The increase in pressure in the master cylinder is equal to the additional force provided by the driver through the cross section of the master cylinder piston.

Figure 6:
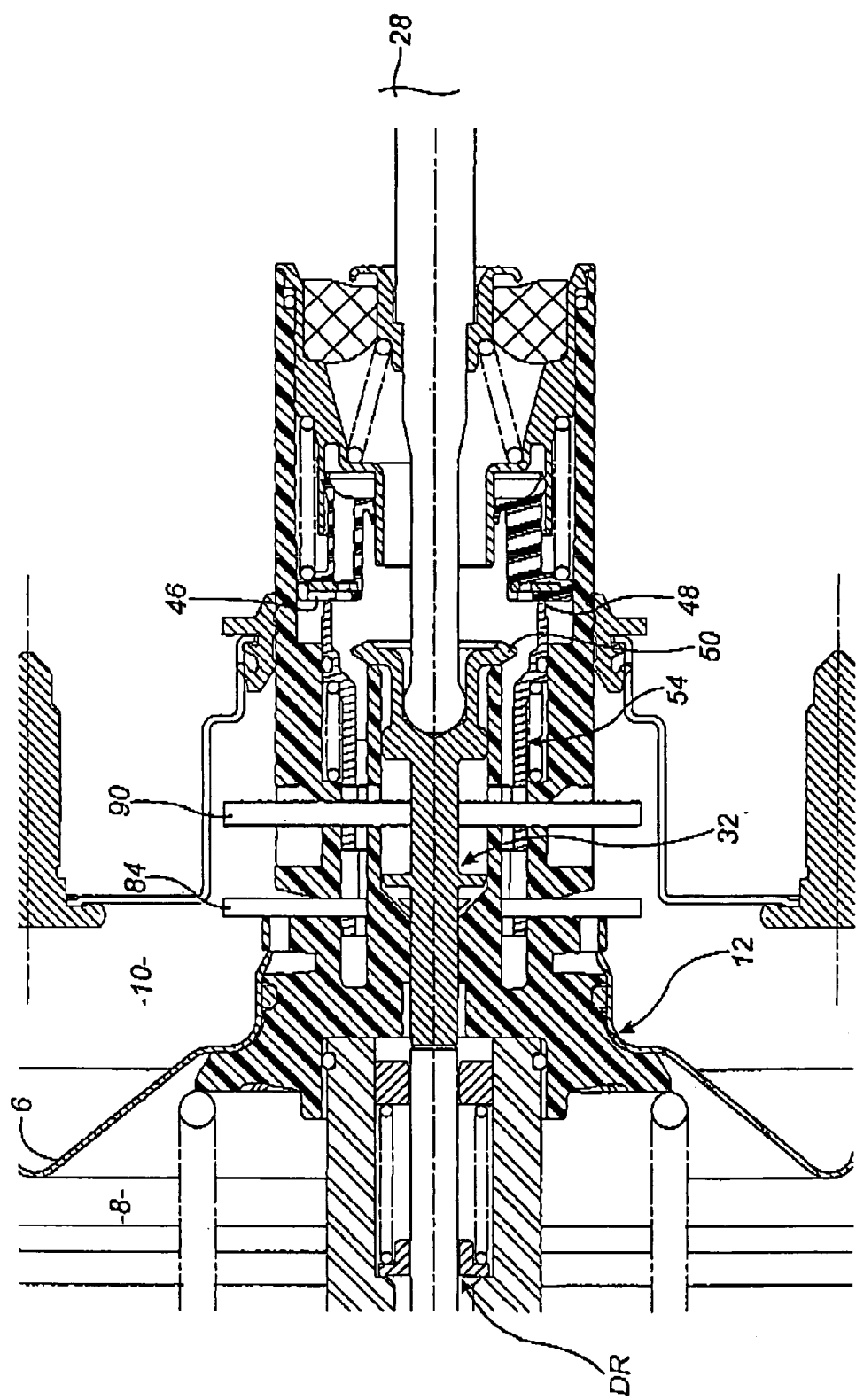
FIG. 6 is a part view of the booster of FIG. 1 in longitudinal section, at the end of the braking phase.

FIG. 6 corresponds to the end of the braking operation, the driver at least partially releasing the brake pedal. The plunger distributor is then driven along with the control rod toward the rear, and the intake valve seat 50 comes into contact with the valve 46 so as to interrupt the supply of air at atmospheric pressure to the rear chamber and takes the valve 46 away from the equalizing seat 48, placing the front chamber 8 and the rear chamber 10 in communication. The pressures are then equalized on either side of the skirt 6, which returns to the rest position under the action of the return spring. The rest position for the pneumatic piston 12 is determined by the second key 90 bearing against the annular bearing surface 119 of the casing 2, as is that for the plunger distributor which butts against the key 90 by way of the collar 98.

The second end 99 of the second apertures 88 also moves away from the front face 100 of the first key 84 by the action of the return spring 58 for the bushing.

The booster is then once more in position to operate with a minimum actuation travel.

FIGS. 7, 7a, 8, 9, 9a and 10 show a booster according to a second embodiment. We will focus on describing only the central part of the booster, that is to say the three-way valve and reaction devices, the other components being of more or less the same structure as those described in FIGS. 1 to 7.

The pneumatic piston 12 is traversed by the axial bore 34, in which the bushing 54 is slideably mounted in a sealed manner; in particular, the bushing comprises a first larger-diameter rear axial portion 160 slideably mounted in the second part 38 of the bore 34 and a second smaller-diameter front portion 162 slideably mounted in the third part 40 of the bore 34. The first portion 160 and the second portion 162 are connected by a shoulder 164.

The O-ring seal 66 providing sealing for the sliding movement of the bushing in the bore 34 is mounted in a groove in the rear portion 160 of the bushing.

The first key 84 is mounted fixedly on the bushing 54 according to the second embodiment, passing into the pneumatic piston 12 by way of the two first diametrically opposed apertures 86 and into the bushing by way of the two second diametrically opposed apertures 88. The defined travel C is determined by the distance separating a first rear face 100' of the key and second rear ends 99' of the first apertures 86 in the piston 12. At rest, the key 84 bears against the first front ends of the apertures 86 in the piston by way of a second front face.

The second key is identical to the key described above for the first embodiment.

The elastic means 58 keeps the bushing immobile with respect to the piston 12 until such time as the piston 12 has completed the travel C, that is to say until such time as the rear ends 99' of the first apertures have come into contact with the rear face 100' of the first key 84. The elastic means bears by way of a first longitudinal rear end 174 against a front shoulder 170 made on the outer wall of the bushing and by way of a second longitudinal front end 176 against an annular narrowing 172 at the front end of the third part 40 of the bore 34. Advantageously, the annular narrowing 172 extends axially rearward by way of a cylindrical portion forming a transverse retaining stop for the front end 176 of the elastic means 58. The elastic means is advantageously a cylindrical spring.

The return spring 112 for the control rod 28 is mounted so that it bears between a rear end of the bushing 54 and the control rod 28. In the example represented, the spring bears by way of a first longitudinal front end 180 against a bottom end 182 of an axial groove 178 made in the larger-diameter portion 160 of the bushing 54 and a first front face 184 of the frustoconical widening 78 of the plunger distributor, the second valve seat being borne by a second rear face opposed to the first face of the widening.

This embodiment offers a number of advantages. On the one hand, it provides the driver with a pedal feel very similar to that obtained with known devices. Specifically, in the course of the first operating phase of the booster during which the piston 12 completes the travel C, the front end 180 is immobile with respect to the piston and to the control rod 28, since the bushing 54 is immobile. Consequently, the load on the spring 112 remains constant and provides a very uniform pedal feel, thereby no variation in the feel during the movement of the pneumatic piston during the first actuating phase of the booster.

On the other hand, the action of moving the return spring 112 frees the space at the rear end of the tail of the piston 12, facilitating the transverse displacement of the control rod, this displacement being desired by automobile manufacturers.

Finally, the freed space has a simple geometry which facilitates the installation of soundproofing means forming an effective barrier to noise coming from the engine compartment and likely to appear in the cabin. These soundproofing means are, for example, made of open-cell foam through which air can pass.

The operation of the booster according to the second embodiment is substantially the same as that of the first embodiment. In the second embodiment, the key 84 remains immobile with the bushing.

Figure 7:
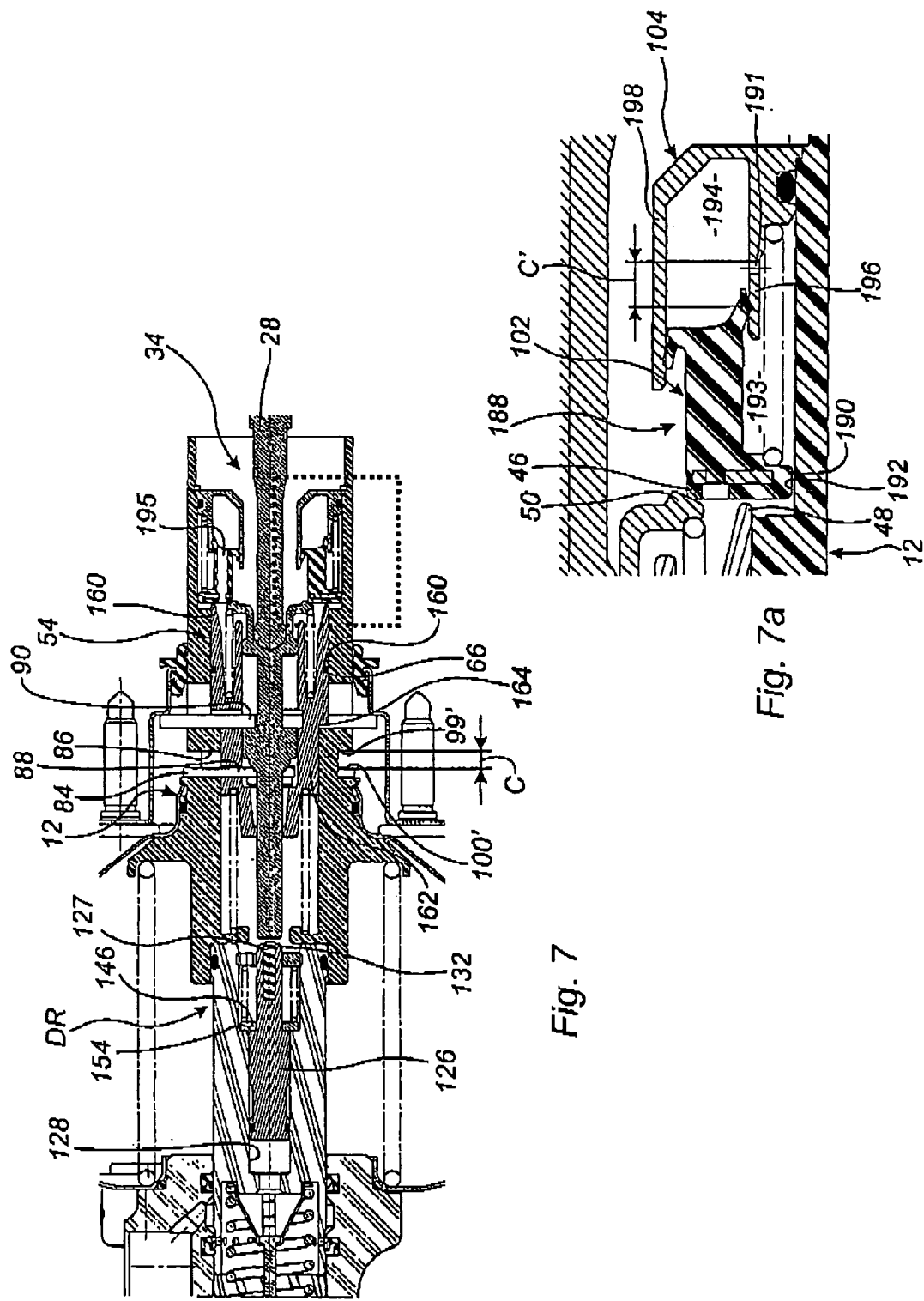
FIG. 7 is a view of a detail in longitudinal section of a first example of a second embodiment of a booster according to the present invention at rest.
Figure 8:
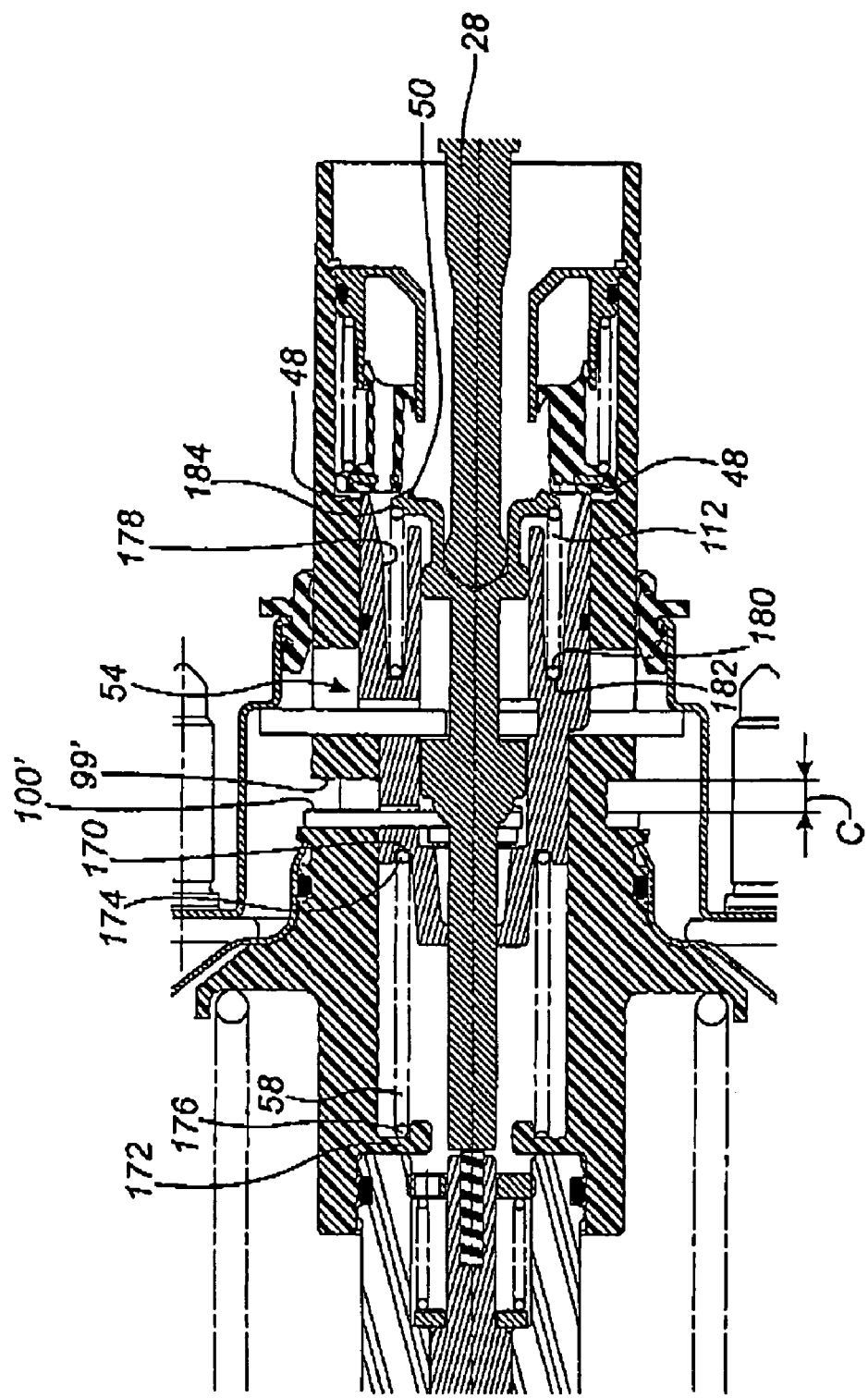
FIG. 8 is a part view of the booster of FIG. 7 in longitudinal section, in a first actuating phase.
Figure 9:
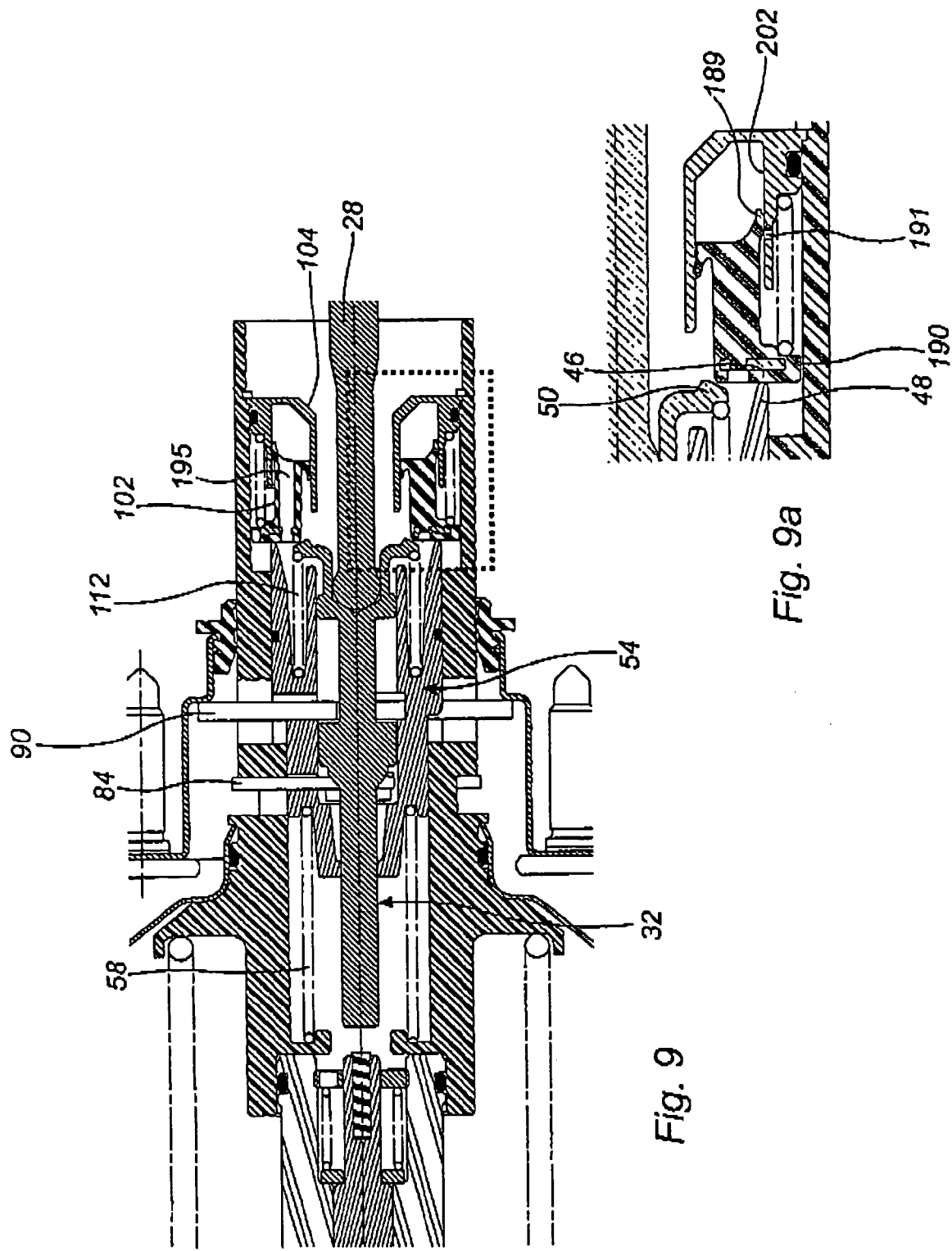
FIG. 9 is a part view of the booster of FIG. 7 in longitudinal section, in a second actuating phase.
Figure 10:
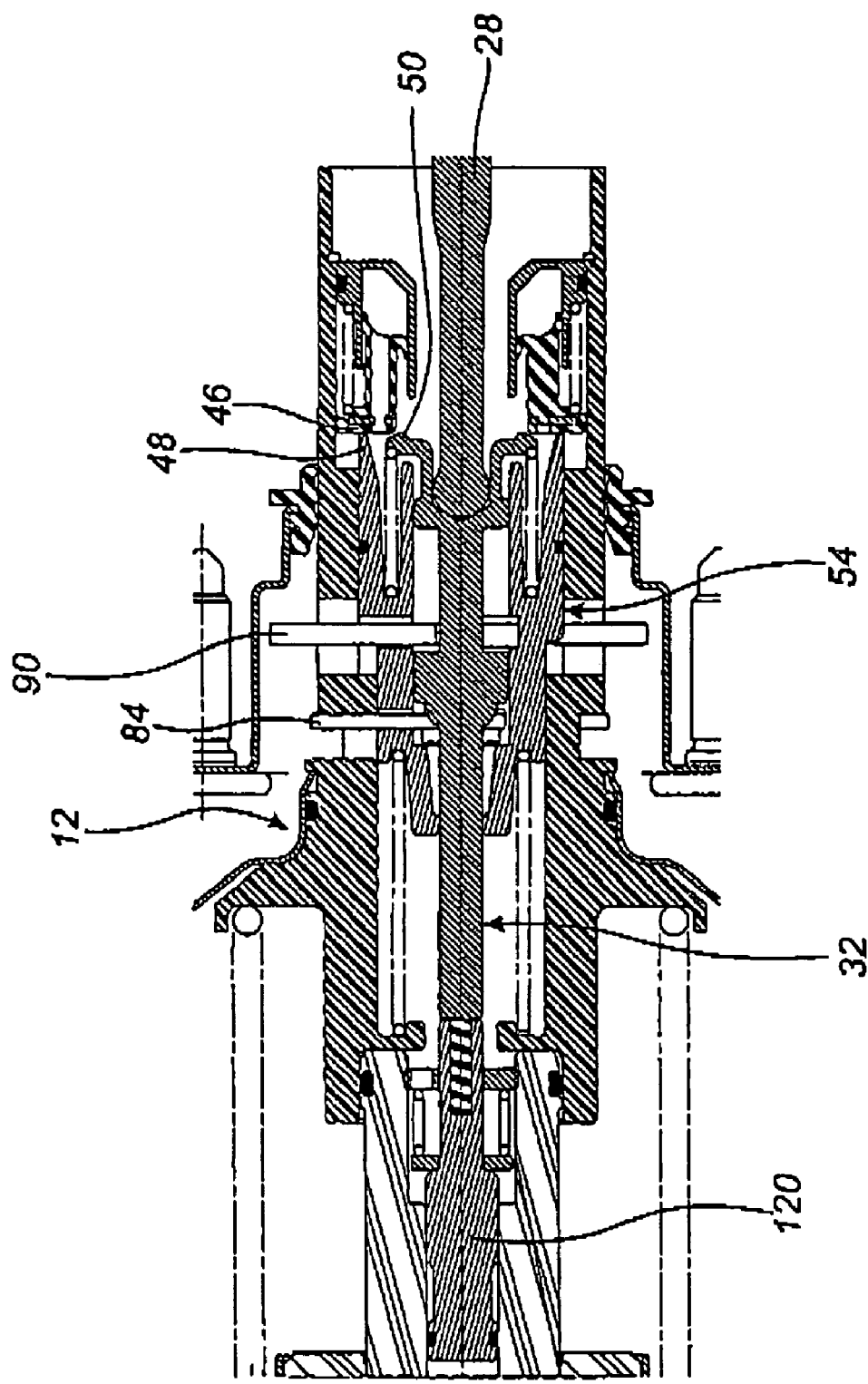
FIG. 10 is a part view of the booster of FIG. 7 in longitudinal section, in a third actuating phase.

FIG. 7 also shows a reaction device DR according to a second variant embodiment applied to the present invention, the auxiliary piston 126 being mounted in a floating manner in the axial bore 128, the auxiliary piston bearing by way of its shoulder 154 against the ring 146 and a clearance being provided between the feeler and the second end 132 of the auxiliary piston.

Advantageously, the rear end of the auxiliary piston is provided with a sound-absorbing element 127, for example a rubber element which is applied against the feeler during contact between the feeler and the auxiliary piston.

FIG. 14*a* shows a reaction device according to a third variant embodiment, in which device the auxiliary piston does not bear at rest against the ring 146, and the feeler and the end 132 are in contact.

FIG. 14*b* shows a reaction device according to a fourth variant embodiment comprising a return spring 129, and in which the auxiliary piston bears at rest by way of its shoulder 154 against the ring 146 and a clearance is provided between the feeler and the second end 132 of the auxiliary piston.

Advantageously, the booster according to the present invention also comprises means for reducing the speed of movement of the skirt/piston assembly in the first operating phase of the booster so as to reduce the speed of contact between the piston and the bushing by way of the first key 84. Specifically, when the driver presses on the brake pedal, closing communication between the front and rear chambers and supplying the rear chamber with air at atmospheric pressure, the skirt and the piston move off very rapidly. This rapid movement is likely to create an unpleasant feel for the driver, with the pneumatic piston taking the bushing 54 beyond the travel C with an excessive speed.

FIG. 7*a* shows that the means 188 for slowing the starting speed of the skirt and the piston are formed by a passage for communication between the low-pressure front chamber and the variable-pressure rear chamber while the valve 46 is applied to the equalizing valve seat 48 and interrupts communication between the front chamber and the rear chamber by the usual means and while the valve 46 is moved apart from the intake valve seat 50. The communication passage comprises a first duct 190 formed between an outer wall 192 of the sleeve 102 bearing the valve 46 and the first rear part 36 of the passage 34. In the example represented (FIG. 8), the duct 190 has an annular shape although it would also be possible to provide angularly distributed ducts formed by axial channels recessed into the outer wall of the sleeve 102 or into the wall of the first part 36 of the passage 34. The communication passage 188 also comprises at least one radial duct, advantageously a number of substantially radial ducts 191 made in a first outer axial cylindrical extension 196 of the cage 104, so as to place in communication, at least at the start of the braking phase, a first outer annular chamber 193 delimited on the one hand by the body of the pneumatic piston 12 and on the other hand by the sleeve 102, and a second cylindrical extension 198, and a second inner annular chamber 194 delimited by the first cylindrical extension 196, the second axial cylindrical extension 198 of the cage 104 and a rear face 200 of the sleeve 102. The first and second extensions 196, 198 are joined together at a common rear end 200.

The sleeve also comprises in a known manner at least one axial bore 195 placing the second inner annular chamber 194 and the variable-pressure chamber in communication across the annular surface of the valve 46.

The booster also comprises means for sealing off the communication passage 188. In the example represented, the sleeve 102 comprises at its rear end a lip 189 in sealing contact against an inner wall 202 of the first cylindrical extension 196 and capable of coming, beyond a certain travel C', opposite ducts 191 so as to interrupt communication between the first and the second annular chambers 193, 194.

Of course, it is possible to provide other sealing means, for example an O-ring seal borne by a rigid rear part of the sleeve.

The radial ducts 191 are advantageously uniformly distributed in an angular manner in the first cylindrical extension 196.

At rest and over the defined travel C' at the start of braking, the passage 188 places the low-pressure chamber in communication with the variable-pressure chamber via the duct 190, the radial bores 191 and the axial bore 195. Consequently, at the start of the braking phase, the pressure in the variable-pressure chamber is lower on account of the air caused to escape in the direction of the low-pressure chamber. Beyond the defined travel C', the lip covers the radial bores 191 so as not to reduce the assist which can be provided by the booster (FIG. 9*a*).

The second defined travel C' is preferably at most equal to the first defined travel C in order to slow down the speed at which the pneumatic piston 12 moves with respect to the bushing 54. However, it would not constitute a departure from the scope of the present invention to choose a second travel C' greater than the first travel C.

It is becoming increasingly frequent to supplement a pneumatic brake booster with an emergency brake-boosting device enabling the booster to act so as to rapidly slow down the vehicle.

Figure 11:
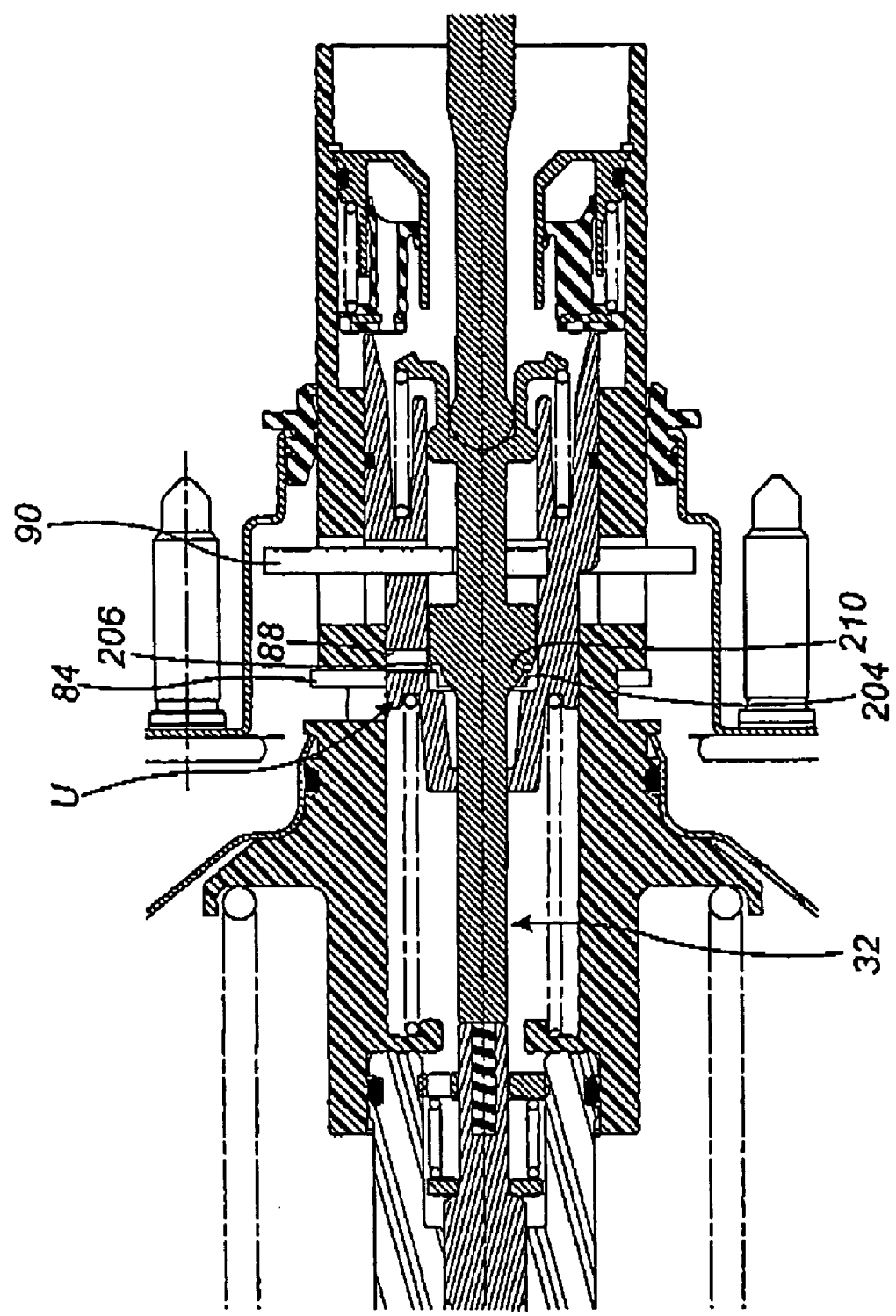
FIG. 11 is a view in longitudinal section of a booster according to the second embodiment comprising an emergency brake-boosting device at rest.
Figure 12:
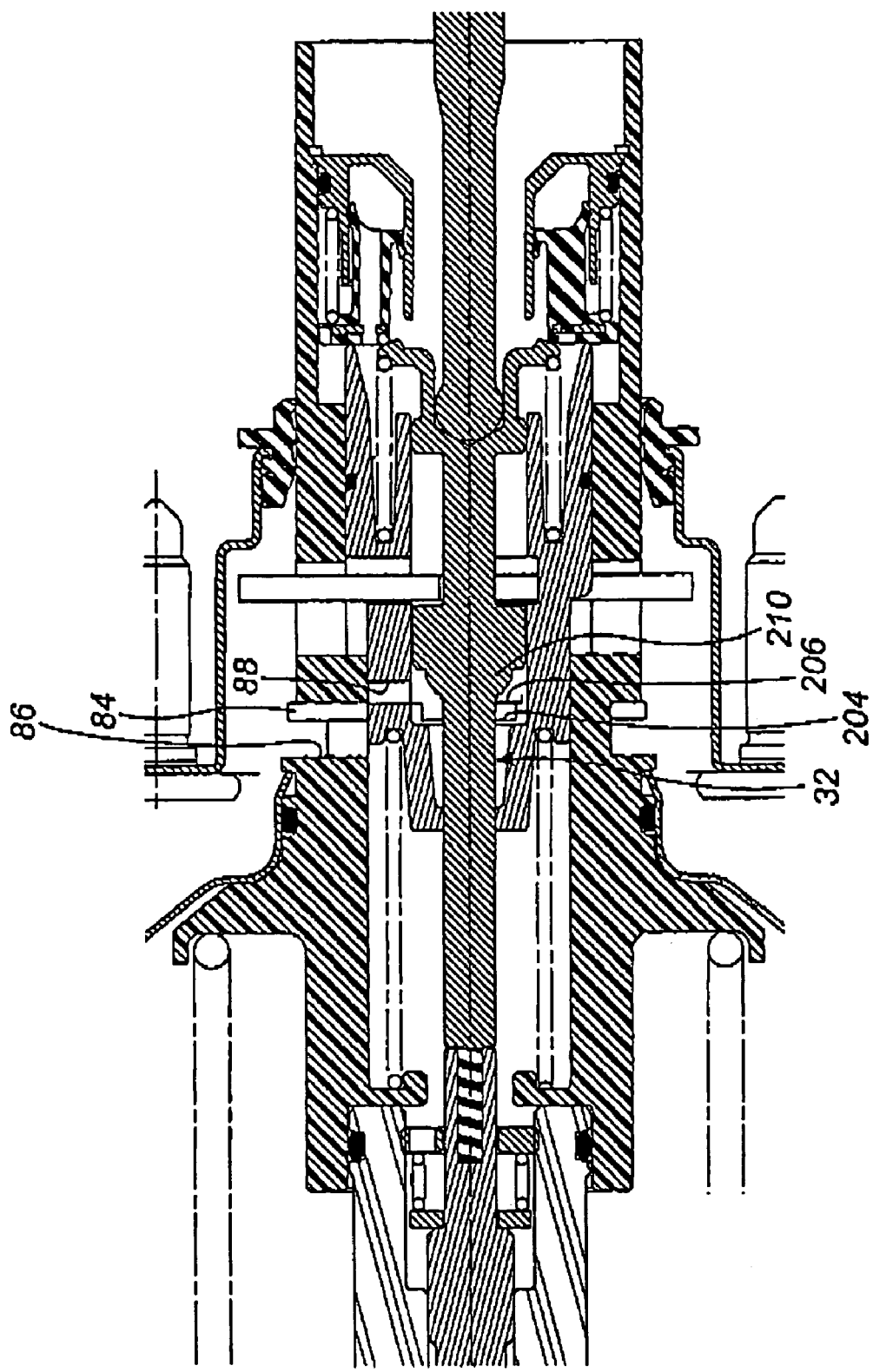
FIG. 12 is a part view in longitudinal section of the booster of FIG. 11 in a state of equilibrium when the emergency brake-boosting device has been triggered.

FIGS. 11, 12 show a booster according to the present invention comprising a pneumatic brake-boosting device U which is triggered when the control rod 28 is moved with a speed greater than a defined speed Vd.

The device U comprises a means for the axial indexing of the bushing 54 in a first advanced position P1 and in a second retreated position P2.

The indexing means is formed by the first key 84 secured to the bushing and is able to cooperate with first and second front faces 204, 206 of the two second apertures 88. The first and second front faces 204, 206 are axially offset and their cooperation with the front face of the key respectively defines the first and second positions P1, P2.

Figures 13A, 13B:
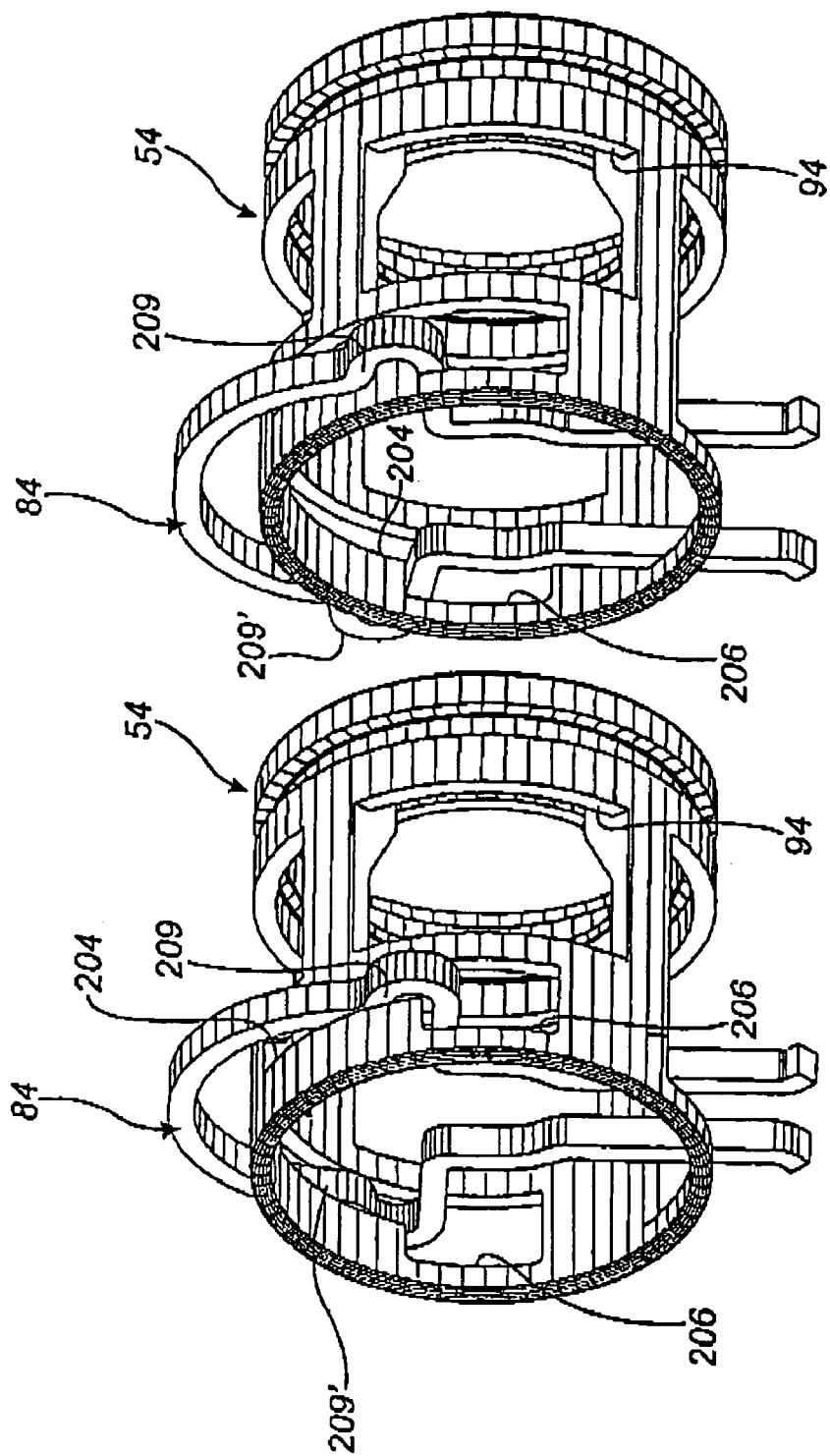
FIGS. 13a and 13b are three-quarter views of isolated elements of the booster of FIG. 9.

FIGS. 13*a* and 13*b* show the key 84 cooperating with the bushing in the position P1 and in the position P2 respectively. The key 84 has the shape of a spring clip, made of spring steel wire or of plastic for example, provided with first 209 and second 209' substantially parallel branches entering the apertures 88 and surrounding a front part 208 of the plunger distributor.

The plunger distributor comprises on its front part a frustoconical surface 210 which is able to move apart the two branches 209, 209' when the plunger distributor moves by a certain travel relative to the bushing 54.

More specifically, the frustoconical surface progressively widens toward the rear and its movement toward the front parts the two branches 209, 209' out of the apertures 88 in such a way that the branches 209, 209' escape the first faces 204 against which they were supported. Owing to the force exerted by the spring 58, the bushing is pushed toward the rear in a sealed manner until it bears by way of the second front faces 206 of the apertures 88 against the branches 209, 209' of the key. Consequently, the valve seat 48 is pushed toward the rear (position P2).

The second key 90 makes it possible, at the end of a braking phase, to move the bushing 54 toward the front so as to replace it in the initial position. The branches of the key then move away from the frustoconical element, elastically resuming their initial transverse position and butting against the first front faces 204 of the apertures 88.

We will now explain the operation of the booster according to the present invention provided with the above-described emergency brake-boosting device.

In normal braking (FIG. 11), when the control rod 28 and thus the plunger distributor are moved at a speed below the defined speed Vd, the frustoconical surface remains at a distance from the key 84 and the bushing does not retreat in the direction of the valve 46, said bushing staying in the position P1, with the branches bearing on the first front faces 204 (FIG. 13*a*).

The valve 46 comes into contact with the first valve seat 48 and moves away from the second valve seat 50, the rear chamber then being isolated from the front chamber and supplied with air at atmospheric pressure. The pneumatic piston 12 together with the skirt moves toward the front, while the bushing remains immobile until such time as the piston 12 has completed the defined travel C.

When the piston 12 has completed the travel C, the bushing 54 is taken along by the pneumatic piston by way of the key 84 and the booster then operates as a booster of known type.

In emergency braking (FIG. 12), when the plunger distributor is moved at a speed above the speed Vd, the frustoconical surface comes closer to the key 84 until it is interposed between the branches, forcing them to move apart and to escape radially from the first axial face 204 of the second apertures 88 in the bushing (FIG. 11). The bushing, under the action of the spring 58, is pushed in the direction of the valve 58 so as to assume the position P2, the branches of the key 84 bearing against the second front faces 206 (FIG. 13*b*). The position of the equalizing seat 48 is then modified, as is the equilibrium position of the plunger distributor. Specifically, in order to reach the state of equilibrium (FIG. 12), that is to say contact between the valve 46 and the first and second valve seats 48, 50, the plunger distributor must be in a retreated position, increasing the jump distance separating the feeler from the rear end of the auxiliary piston. Consequently, the jump is increased, increasing the braking level.

At the end of the braking operation, when the force is released on the pedal, the plunger distributor is returned to its rest position by the return spring 112, the front and rear chambers are once more in communication, and the piston 12 retreats. The second key 90 then comes into bearing contact against the annular bearing surface 119 of the hollow shaft 25 and forces the bushing 54 to slide in the direction of the hydraulic piston relative to the key 84 which bears against the pneumatic piston by way of its transverse ends, and the branches leave the second contact 206, slide along the bushing and elastically penetrate the bushing so as to come once more into contact with the first face 204.

The booster is then ready once more to operate in the usual way.

Integrating the emergency brake-boosting device into the booster according to the present invention is extremely simple and does not require any modification of the elements constituting the booster. In addition, it is very easy to supply a booster either equipped or not equipped with said device by either making the frustoconical surface available or omitting it, the same first key 84 being able to be used. The problems associated with the inventory control of parts are consequently greatly reduced, the parts used for the two types of booster being virtually all identical.

Of course, the scope of the present invention would not be departed from with a braking device comprising an emergency brake-boosting device of hydraulic type arranged in the primary piston of the master cylinder and reducing, beyond a certain speed of movement of the braking command and/or beyond a certain force applied to the braking command, a reaction transmitted to this same braking command.

A booster with short actuating travel, of very reliable operation and simple design has been successfully realized.

Of course, it would be possible to provide a booster according to the present invention comprising a conventional reaction device of the reaction disk type.

The master cylinder is advantageously a tandem master cylinder comprising first and second hydraulic circuits provided respectively with a primary piston and a secondary piston sliding in a sealed manner in the body of the master cylinder, the primary piston receiving the force applied to the pedal and the boost force provided by the skirt.

The present invention applies primarily to the motor vehicle brake industry.

What is claimed is:

1. A pneumatic brake booster comprising a casing (2) of longitudinal axis (X) formed by first and second shells connected by their radially external ends, in which said casing is an assembly made up of a skirt (6) and a pneumatic piston (12) of longitudinal axis (X) is slideably mounted in a sealed manner, said assembly (6, 12) dividing the inner space (4) of the casing (2) into a low-pressure chamber (8) and into a variable-pressure chamber (10), a return spring which returns the skirt/pneumatic piston assembly (6,12) into the rest position being mounted in the low-pressure chamber (8) between the first shell and a face of the pneumatic piston (12), a three-way valve arrangement (26) actuated by a control rod (28) being mounted in a longitudinal passage (34) bored in the pneumatic piston (12), said control rod (28) being connected by a first longitudinal end to a brake pedal and a second end of said control rod (28) being received in a reception cavity made in a first longitudinal end of a plunger distributor (32), said control rod being returned into a rest position by a return spring (112), said plunger distributor (32) comprising, at a second longitudinal end, a feeler which applies the force of the control rod (28) to a hydraulic piston (122) of a master cylinder by way of a reaction device (DH), said skirt/piston assembly (6, 12) transmitting a pneumatic boost force to the hydraulic piston (122) of the master cylinder via a central face (127) of the pneumatic piston, said three-way valve arrangement (26) comprising first (48) and second (50) valve seats and a valve (46) applied to at least one of the first and second valve seats (48, 50) by a valve spring (106), said second valve seat (50) being borne by a first longitudinal end (44) of the plunger distributor (32), characterized in that the first valve seat is borne by a first longitudinal end of a bushing (54) slideably mounted in a sealed manner in the pneumatic piston (12) over a first defined travel (C), and in that it comprises a securing means for connecting said bushing (54) axially to the pneumatic piston (12) when said pneumatic piston has completed the defined travel (C), further characterized in that it comprises an elastic means (58) maintaining the bushing immobile with respect to the casing (2) of the booster until such time as said defined travel (C) has been achieved, said elastic means being mounted in compression axially between an annular bearing surface (60, 172) made in a wall of an axial passage of the pneumatic piston and a shoulder (64, 170) of the bushing (54).

2. The booster according to claim 1, characterized by a second key (90), perpendicular to the axis (X), mounted fixedly in two third diametrically opposed apertures (92) in the pneumatic piston and arranged axially between the first apertures (86) and the brake pedal and passing through two fourth diametrically opposed apertures (94) made in the bushing (54) so as to form an axial stop in the direction of the brake pedal for the plunger distributor (32) by cooperation between an annular collar secured to the plunger distributor and first and second branches of the second key and so as to define the rest position of the pneumatic piston by cooperation of the transverse ends (117) of said second key (90) with the booster casing.

3. The booster according to claim 2, further characterized by the annular bearing surface (172) of the pneumatic piston is formed by an axial narrowing borne by a face (127) of the pneumatic piston transmitting the boost force to the hydraulic piston of the master cylinder, and in that the shoulder (170) of the bushing is situated axially between the first key (84) and the feeler of the plunger distributor.

4. The booster according to claim 1, characterized in that said securing means is a first key (84) which is secured in terms of movement to said bushing (54) and passes, perpendicularly to the axis (X), through two first diametrically opposed apertures (86) made in the tall of said pneumatic piston and through two second diametrically opposed apertures (88) made in the bushing (54), and in that said defined travel (C) is equal to the distance separating a rear end (99') of the first apertures (86) from a first rear face (100') of the first key (84), and in that said first key (84) is in the shape of a fork having two branches.

5. The booster according to claim 4, characterized in that the return spring (112) for the control rod (28) is mounted so that it bears between a bottom end (182) of an axial groove (178) in the bushing (54) and a first face (184) of a frustoconical widening (78) of the plunger distributor, said widening bearing on a second face opposed to the first face bearing the second valve seat (50).

6. The booster according to claim 5, characterized in that it comprises an emergency brake-boosting device (U) formed by means which are able to move the first valve seat (48) axially in the brake direction when the plunger distributor is moved at a speed above a defined speed (Vd).

7. The booster according to claim 6, characterized in that the first and second arms of me first key (84) are radially elastic, able to be parted radially from one another and cooperate with an axial step (204, 206) borne by the two second apertures (88), said step defining a first axial position (P1) and a second axial position (P2) for the bushing (54), and in that the plunger distributor comprises a means for moving the arms of the first key away radially.

8. The booster according claim 7, characterized in that the means for moving the arms away from one another is a substantially frustoconical surface widening in the direction of the brake pedal, connected rigidly to the plunger distributor and arranged axially between the first key (84) and the second key (90).

9. The booster according to claim 2, characterized in that said pneumatic piston (12) comprises an annular axial groove (56) receiving said bushing (54) and defining a central tubular section (54) reeving the plunger distributor, and in that the annular bearing surface (60) is made in a wall of the axial groove (56).

10. The booster according to claim 9, characterized in that the central tubular section (57) comprises two fifth diametrically opposed apertures (96) for the passage of the second key (90).

11. The booster according to claim 10, characterized in that said securing means is a first key (84) secured in terms of movement to said pneumatic piston (12) and passing, perpendicularly to the axis (X), through two first diametrically opposed apertures (86) made in the tail of said pneumatic piston and through two second diametrically opposed apertures (88) made in the bushing (54), in that a distance equal to the defined travel (C) separates a second longitudinal end (99) of the bushing (54) and a first face (100) of said first key (84), and in that said key (84) is in the shape of a fork having two branches straddling the central tubular section (57) of the pneumatic piston.

12. The booster according to claim 10, characterized in that the elastic means (58) is a cylindrical spring.

13. The booster according to claim 12, characterized in that the sliding movement between the bushing (54) and the pneumatic piston is sealed by an O-ring seal mounted in a groove made in the outer wall of the bushing.

14. The booster according to claim 13, further characterized by means (188) for reducing the initial speed of movement of the pneumatic piston relative to the booster casing.

15. The booster according to claim 14, characterized in that said means (188) for reducing the initial speed of the piston (12) comprise a passage for communication between the low-pressure chamber and the high-pressure chamber when the valve (46) is moved apart from the second valve seat (50) until such time as the pneumatic piston (12) has completed a second defined travel (C').

16. The booster according to claim 15, characterized in that said passage is formed by a duct formed between an outer wall of a sleeve (102) bearing at an axial end the valve (46) and the passage (34) of the piston (12), at least one radial bore made in a first axial cylindrical extension (196) of a cage (104) surrounding the control rod and at least one axial bore (195) in the sleeve (102) placing the variable-pressure chamber in communication with an annular chamber (192) delimited by the sleeve (102), the first cylindrical extension (196) and a second inner cylindrical extension (198), which is concentric to the first extension (196) and connected in a sealed manner to the first extension (196) by an axial end oriented toward the brake pedal, and in that the sleeve comprises at an opposite end to the valve (46) a lip which is able to come into a blocking position over the radial bore (191) when the piston has moved by the defined travel (C').

17. The booster according to claim 16, characterized in that the second defined travel is at most equal to the first defined travel (C).

18. The booster according to claim 17, characterized in that the reaction device (DR) comprises an auxiliary piston (126) which is slideably mounted in a sealed manner in an axial through born (128) of the hydraulic piston (122) of the master cylinder and is subjected via a first end (130) to the hydraulic pressure prevailing in the master cylinder and is thereby capable of coming into contact with the feeler of the plunger distributor via a second opposed longitudinal end (132), and in that it also comprises a jump spring (138) supported fixedly (144) via a first longitudinal end on the hydraulic piston and via a second end supported in a floating manner (146) with respect to the hydraulic piston.

19. The booster according to claim 18, characterized in that the fixed support (144) is a ring force-fitted into the axial bore of the hydraulic piston, and in that the floating support is a ring mounted slideably in the axial bore (128) and supported, when the pressure in the master cylinder is below the defined pressure (PH), against an annular bearing surface (148) of the bore (128) connecting first and second portions (140, 142).

20. The booster according to claim 19, characterized in that the auxiliary piston is supported via the second longitudinal end (132) against the feeler, and in that a clearance is provided between the floating support and a shoulder (154) of the auxiliary piston.

21. The booster according to claim 19, characterized in that the auxiliary piston is supported against the floating support by a shoulder (154), and in that a clearance is provided between the second longitudinal end (132) and the feeler.

22. The booster according to claim 21, characterized in that the reaction device (DR) comprises a return spring (129) mounted so that it bears between the first end (130) of the auxiliary piston and an end of the axial bore (128), keeping the auxiliary piston in contact with the floating support, and in that a clearance is provided between the second longitudinal end (132) of the auxiliary piston and the feeler.

23. The booster according to claim 19, characterized in that the reaction device (DR) comprises a return spring (129) mounted so that it bears between the first end (130) of the auxiliary piston and an end of the axial bore (128), said spring keeping the auxiliary piston bearing against the feeler via the second longitudinal end (132), and in that a clearance is provided between the floating support and a shoulder (154) of the auxiliary piston.

24. The booster according to claim 23, characterized in that the sliding movement between the auxiliary piston and the axial bore (128) of the hydraulic piston is sealed by means of an O-ring seal mounted in a groove made in the periphery of the auxiliary piston.

25. The booster according to claim 24, characterized in that the auxiliary piston comprises at its second end a shock-absorbing element, advantageously made of elastomer, intended to reduce the contact noise between the feeler and the auxiliary piston.

26. A braking device comprising a master cylinder connected hydraulically to brakes arranged at the wheels of a motor vehicle and a booster interposed between the master cylinder and a control rod (28) moved by means of a brake pedal, said booster transmitting a force applied to the pedal and applying a pneumatic boost force to a hydraulic piston (122) of the master cylinder, characterized in that said booster is a booster according to any one of the preceding claims, end in that said hydraulic piston (122) bears via a first longitudinal end (124) against an end of the pneumatic piston (12) emerging into the low-pressure chamber (8) of the booster.

* * * * *